United States Patent
Thompson et al.

(10) Patent No.: US 8,242,725 B2
(45) Date of Patent: Aug. 14, 2012

(54) METHOD FOR OPERATING SENSORLESS AND BRUSHLESS MOTORS

(75) Inventors: James L Thompson, Ypsilanti, MI (US); Kyi-Shin Shiah, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 12/103,278

(22) Filed: Apr. 15, 2008

(65) Prior Publication Data
US 2009/0256507 A1 Oct. 15, 2009

(51) Int. Cl.
*H02P 6/08* (2006.01)

(52) U.S. Cl. ............ 318/400.13; 318/400.32; 318/400.1

(58) Field of Classification Search ............. 318/400.13, 318/400.32, 400.1
See application file for complete search history.

(56) References Cited

U.S. PATENT DOCUMENTS

| | | | |
|---|---|---|---|
| 4,678,973 A * | 7/1987 | Elliott et al. ............. | 318/400.11 |
| 4,814,677 A * | 3/1989 | Plunkett .................... | 318/400.02 |
| 5,206,567 A | 4/1993 | Sakurai et al. | |
| 5,223,771 A * | 6/1993 | Chari ........................ | 318/400.09 |
| 5,350,984 A * | 9/1994 | Carobolante et al. .... | 318/400.32 |
| 5,350,987 A * | 9/1994 | Ueki .............................. | 318/466 |
| 5,451,832 A | 9/1995 | Cameron et al. | |
| 5,530,326 A * | 6/1996 | Galvin et al. ............ | 318/400.11 |
| 5,572,097 A | 11/1996 | Caeron | |
| 5,623,379 A | 4/1997 | Nishimura et al. | |
| 6,046,555 A * | 4/2000 | Szoboszlay ............... | 318/400.04 |
| 6,441,572 B2 * | 8/2002 | Batzel ....................... | 318/400.33 |
| 6,570,351 B2 | 5/2003 | Miyazaki et al. | |
| 6,774,590 B2 * | 8/2004 | Inagawa et al. ............... | 318/139 |
| 6,998,799 B2 * | 2/2006 | Rote et al. ................. | 318/400.13 |
| 7,909,729 B2 * | 3/2011 | Tanaka et al. ..................... | 477/8 |

* cited by examiner

*Primary Examiner* — Walter Benson
*Assistant Examiner* — David S Luo
(74) *Attorney, Agent, or Firm* — Frank MacKenzie, Esq.; Tung & Associates

(57) ABSTRACT

A method of aligning a sensorless brushless polyphase DC motor including aligning a rotor to a known stopped position with respect to at least one coil during a shut-down of said motor wherein a voltage is applied to one or more coils in a timed sequence of voltage application steps; and, starting said rotor from said known stopped position, wherein a voltage is applied to one or more coils in a timed sequence of voltage application steps.

18 Claims, 3 Drawing Sheets

| TIMING TABLE 1 | | | | | | |
|---|---|---|---|---|---|---|
| | S1 | S2 | S3 | S4 | S5 | S6 |
| I_1 (STOP) | OFF | V+ | OFF | GRD | OFF | GRD |
| I_2 (1st STEP) | V+ | OFF | OFF | OFF | OFF | GRD |
| I_3 | V+ | OFF | OFF | OFF | GRD | OFF |
| I_4 | OFF | OFF | OFF | OFF | GRD | V+ |
| I_5 | OFF | OFF | GRD | OFF | OFF | V+ |
| I_6 | OFF | V+ | OFF | GRD | OFF | OFF |
| I_7 | OFF | V+ | OFF | OFF | OFF | GRD |

US 8,242,725 B2

METHOD FOR OPERATING SENSORLESS AND BRUSHLESS MOTORS

FIELD OF THE INVENTION

This invention generally relates to sensorless brushless motors and, and more particularly provides a method for stopping and/or aligning sensorless brushless polyphase motors where it is desirable to reduce a time required to reach optimal operating speed in a subsequent motor start-up process, including fuel pumps in motor vehicles.

BACKGROUND OF THE INVENTION

Sensorless brushless polyphase motors (SBPM's), particularly applicable to DC motors, are increasingly popular in consumer and industrial electronics because of their compact size, controllability, and high efficiency. For example, this type of motor including sensorless commutation eliminates costly position sensors, reducing complexity and improving reliability. In addition, sensorless brushless polyphase motors (SBPM's) have a longer life compared to conventional brush motors and achieve operation with reduced contamination of the motor and associated structures.

One shortcoming of SBPM's is that upon starting the motor, the position of the rotor with respect to a coil (stator) including two or more coils is unknown, requiring complex and time consuming starting algorithms to determine the position of the rotor so that proper synchronization of current or voltage to the coil may take place to reach operating speed. As a result, SBPM's may take longer than conventional motors to reach a rated operating speed than is desirable.

For example, in Sakurai et al. (U.S. Pat. No. 5,206,567), a sensorless brushless DC motor (e.g., spindle motor for rotating a magnetic recording medium) is started by positioning the rotor during a start up sequence of the motor where three coils are alternately excited and a rotor detection circuit is employed to sense rotor vibration and determine the rotor position prior to accelerating the motor to operating speed.

Carobolante et al. (U.S. Pat. No. 5,350,984) provide a method for start-up of a sensorless brushless DC motor where a threshold rotary speed of a rotor is first determined to determine an alignment of the rotor with respect to the coils prior to accelerating the motor to operating speed.

Cameron et al. (U.S. Pat. No. 5,572,097) provide a method and apparatus for starting a polyphase DC motor where a rotor is aligned in the motor in preparation for starting the motor where a first energization signal is applied to field coils of the motor in a first predetermined phase for a first predetermined time and then a second energization signal having a second predetermined phase displaced from the first phase by a predetermined amount is applied to the field coils for a second predetermined time period.

Nishimura et al. (U.S. Pat. No. 5,623,379) provide a method of controlling a start-up of a motor used for a disk apparatus where an aligning operation is performed immediately after the motor is stopped where the aligning operation rotates the rotor to a predetermined angular position relative to the stator. The alignment is performed after stopping the motor and then sending acceleration signals followed by a deceleration signal after a predetermined time period.

The prior art does not provide a method for aligning a sensorless brushless polyphase motor during a stopping operation to enable efficient alignment of the motor and to enable an efficient and pre-aligned subsequent start-up of the motor without alignment at the next instance of operation of the motor.

Thus, there is a need for an improved method for aligning a sensorless brushless polyphase motor during a stopping operation to enable efficient alignment of the motor and to enable an efficient and pre-aligned subsequent start-up of the motor without alignment at the next instance of operation of the motor, including with respect to motors where fast startup is critical, such as in motor vehicle fuel pumps.

Therefore it is an object of the invention to provide an improved method for aligning a sensorless brushless polyphase motor during a stopping operation to enable efficient alignment of the motor and to enable an efficient and pre-aligned subsequent start-up of the motor without alignment at the next instance of operation of the motor, including with respect to motors where fast startup is critical, such as in motor vehicle fuel pumps.

SUMMARY OF THE INVENTION

In one embodiment, a method is presented for aligning a sensorless brushless polyphase DC motor including aligning a rotor to a known stopped position with respect to at least one coil during a shut-down of said motor wherein a voltage is applied to one or more coils in a timed sequence of voltage application steps; and, starting said rotor from said known stopped position, wherein a voltage is applied to one or more coils in a timed sequence of voltage application steps.

These and other objects, aspects and features of the invention will be better understood from a detailed description of the preferred embodiments of the invention which are further described below in conjunction with the accompanying Figures.

DETAILED DESCRIPTION OF THE PREFERRED EMBODIMENT

The present invention achieves the foregoing objects, aspects and features by providing a method for aligning the rotor with respect to associated coils of a sensorless brushless polyphase DC motor (SBPM) during a stopping operation of the SBPM, where a sequence of voltage application steps is controlled by a controller through a switching circuit which selectively controls application of voltage in a stepwise manner to selected one or more of the coils in the SBPM in order to align the SBPM during a motor stopping operation whereby the position of the rotor is known at the time of stopping the SBPM and is known at the time of a subsequent start-up of the SBPM motor thereby enabling a the subsequent start-up operation of the motor with an improved start-up time.

It will be appreciated that although the invention is implemented in exemplary manner with respect to a SBPM fuel pump in a Hybrid Electric Vehicle (HEV), that the method of the present invention may be applied to other types of SBPM motors including other types of vehicle accessory SBPM motors, such as a water pump, engine cooling fan, HVAC fan, compressor motor, and the like, as well as to other types of motor vehicles. Moreover, it will be appreciated that the method of the present invention may be applied to any SBPM including two or more coils and an associated rotor.

Figure 1:
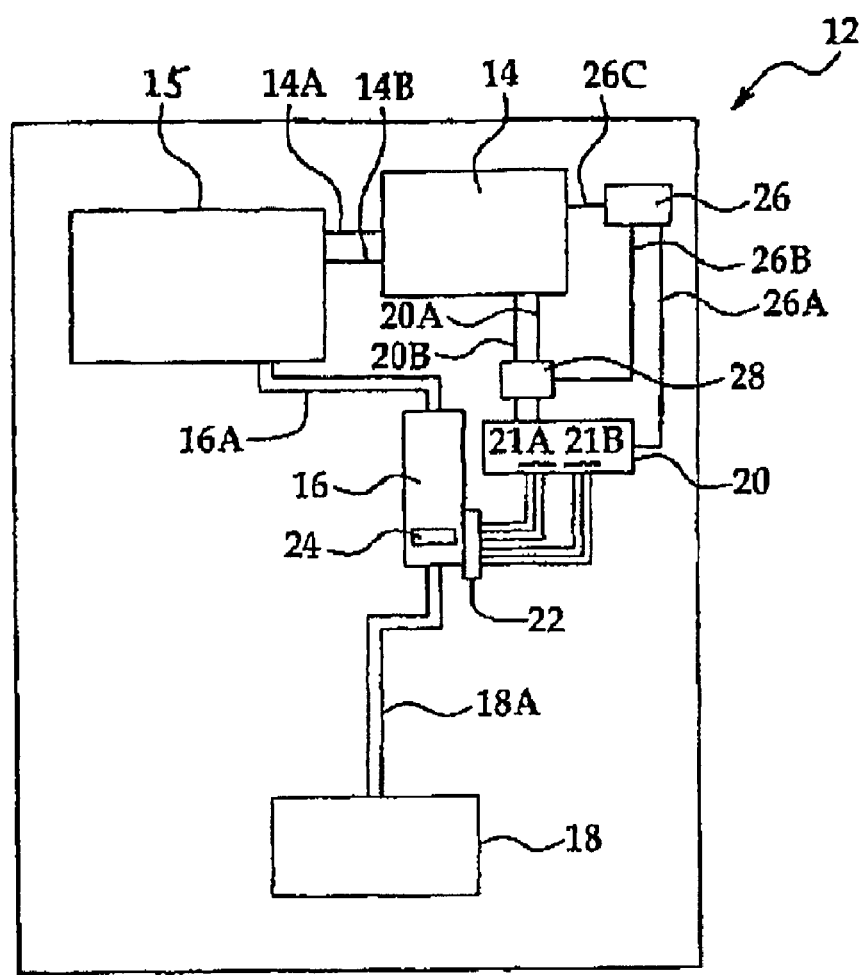
FIG. 1 is a block diagram of a Hybrid Electric Vehicle (HEV) having a sensorless brushless polyphase DC motor driving a fuel pump according to an embodiment of the invention.

Referring to FIG. 1 is shown a block schematic of an HEV 12, including a high voltage (HV) voltage source 14, such as a battery, which may be in electrical communication (e.g., 14A, 14B) with a fuel consuming and driven motor 15 and in electrical communication (e.g., 26C) with a central HEV controller 26. The fuel driven motor 15 may be supplied with fuel (e.g. from fuel conduit 16A) by a sensorless brushless DC motor (SBPM) driven fuel pump 16 from fuel source 18 (e.g. supplied by fuel conduit 18A). It will be appreciated that the HEV 12 includes conventional features such as a drive train including driven wheels (not shown) connected to the (HV) voltage source 14 as well as the fuel driven motor 15.

A fuel pump controller 20 is in electrical communication with a voltage application circuit 22 separate from or integral with the fuel pump 16. The voltage application circuit 22 is in electrical communication with the SBPM 24 which is an integral part of the fuel pump 16. The SBPM may include two or more coils to form a polyphase DC motor, and in exemplary embodiments shown below is a three-phase DC motor. It will be appreciated that voltage application circuits are well known in the art and that any voltage application circuit that may selectively control a voltage according to a programmed timed sequence to one or more of the coils in the SBPM motor 24 in response to output from a controller 20 may be used.

Preferably the voltage application circuit has a voltage application timing resolution (switching speed) on the order of at least milliseconds, for example at least 1-1000 milliseconds. The voltage application circuit 22 may be a switching circuit that selectively switches voltage to one or more of the three coils and may be connected to the controller 20 by voltage supply lines e.g., 21A, to supply associated coils in the motor 24. The fuel pump controller 20 may be a conventional programmable controller including a central processing unit to perform programmed instructions and with memory to store data and programmed instructions.

In one embodiment, the voltage application circuit 22 circuit may include a rotor position detection circuit that includes signal lines e.g., 21B that are in electrical communication with the coils and the controller 20 where the detection circuit detects a back electromotive force (BEMF) of a rotor arm as it passes a position of maximum inductance of a respective one of the coils. Such BEMF detection circuits are well known in the art. The detected BEMF signals are then provided to the controller 20 where the controller may then calculate a position of the rotor as a function of time (i.e., velocity), and/or acceleration/deceleration of the rotor based on the elapsed time between at least two signals from one or more coils.

The fuel pump controller 20 may be in electrical communication with the central HEV controller 26 (e.g., two way communication line 26A) which may send a signal that indicates stopping of the fuel driven motor HEV 12 (e.g., turning off an ignition switch). Upon stopping of the HEV 12, including the fuel driven motor 15, the fuel pump controller 20 may be supplied electrical energy from the HV source 14 for continued operation by a timer circuit included in a voltage transformer 28 (e.g., in line with respect to power supply lines 20A and 20B), where the timer circuit is configured or programmed to continue to supply an operating voltage to the controller for a selected time beyond the point of stopping the HV source 14 (turning off the ignition switch) or until such time as a signal is received from the fuel pump controller 20 that the fuel pump is stopped and aligned. The timer circuit may be in communication with the central controller 26 (e.g., communication line 26B) as well as the controller 20.

Alternatively, a separate voltage source including a timer circuit, such as a capacitor or ultra-capacitor charged by the HV source 14 during vehicle operation may be provided to supply the voltage required to operate the controller 20 during the stopping/aligning operation of the SBPM following motor vehicle shut-down.

The fuel pump 16 may be stopped based on pre-programmed instructions including a timed sequence of voltage application steps from the controller 20 through the voltage application circuit 22 to one or more of the coils to achieve a braking operation to stop the SBPM fuel pump motor and/or position the associated rotor arms in a known stopped position with respect to the associated coils (stators) in an alignment operation during stopping of the motor. It will be appreciated that the controller also operates the SBPM at operating speed (angular velocity or revolutions per minute) according a pre-programmed timed sequence of voltage application steps delivered to one or more of the coils through the voltage application circuit 22.

According to one embodiment of the invention, the controller 20 may be pre-programmed to execute instructions to cause the voltage application circuit 22 to supply voltages to one or more of the coils in a timed sequence of steps where each step is executed at programmed time intervals for predetermined periods of time to align the moving part of the SBPM (rotor) to a stopped position following full or partial deceleration of the motor (rotor). The rotor is aligned to a known stopped position where the position of at least one rotor arm of the rotor is known with respect to at least one of the coils. It will be appreciated that knowing the stopped position of one rotor arm with respect to one of the coils will determine the position of the remaining rotor arms with respect to the remaining coils.

The rotor may then be started from the known stopped position without any necessary alignment process to initiate startup of the fuel pump SBPM from the known stopped rotor position during subsequent vehicle start-up. The known stopped position of the rotor may be also stored in memory in the controller and subsequently recalled from memory to initiate startup of the fuel pump SBPM from the known stopped rotor position during subsequent vehicle start-up. It will be appreciated that if the known stopped position is misaligned by some extraneous external force following shut-down of the motor (fuel-pump) but prior to start-up, the controller may include pre-programmed instructions to re-align the rotor to a new known stopped position prior to start-up. For example, the controller may detect misalignment by monitoring the rotor position detection circuit 21B during start-up, at which time a re-alignment may optionally take place or a different set of voltage application step may be selected by the controller to achieve an operating motor speed.

The rotor may be aligned where the rotor travels only in the operating angular direction (e.g., clock-wise or counter-clockwise) or may include a motion opposite to the operating angular direction to achieve a final known stopped position.

The rotor may achieve a final known stopped position where one or more rotor arms is positioned between respective coils (stators) or with one or more rotor arms substantially aligned with coils (stators). For example, by substantially aligned means that the rotor arm is in a position at or near maximum inductance, for example, where at least half of at least one rotor arm periphery is immediately adjacent at least one stator. In one embodiment, at least one of the rotor arms is preferably substantially aligned with a stator or at a position of maximum inductance in a final known stopped position.

Figure 2:
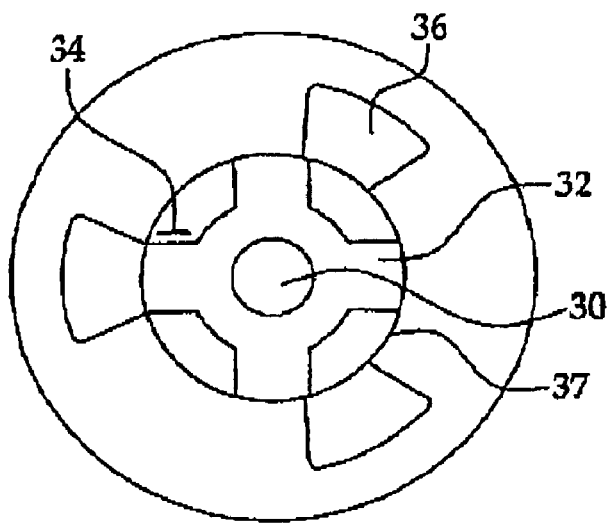
FIG. 2 is a schematic diagram of a portion of an exemplary sensorless brushless polyphase DC motor showing the rotor and associated coils (stators) according to an embodiment of the invention.

For example referring to FIG. 2 is shown an exemplary SBPM 3-phase DC motor including a 4-arm rotor 32 (including rotatable shaft 30) with 4 rotor arms e.g., 34, where each rotor arm is also referred to as a pole. The three stators or coils 36 (e.g. spaced 120 degrees apart), also referred to as poles, are arranged at a periphery of a radius of rotation 37 of the rotor 32. One of the rotor arms, e.g., 34 is shown aligned with a respective stator (coil) i.e., in a position of maximum inductance, while the remaining rotor arms are unaligned with the remaining stators (coils). It will be appreciated that the stators may include more than one coil winding and that there may be multiple stators and multiple rotors in suitable SBPM motors according to the present invention.

In another embodiment, the controller generates a sequence of aligning voltage application steps (voltage applied to one or more coils) based on a determined angular velocity threshold of the rotor which may include determining that the rotor has come to a full stop or is below a predetermined velocity threshold. For example, the angular velocity including zero angular velocity may be determined by the controller by determining at least two BEMF signals generated at known times with respect to at least one of the coils (stators).

In another embodiment, the controller determines an angular velocity (speed) of the motor (e.g., rotor) during stopping of the motor, and when the controller determines that the angular velocity (speed) is below a pre-determined velocity threshold including zero angular velocity, the controller selects from among a series pre-programmed voltage application steps depending on the determined velocity or deceleration rate to align the rotor to a known stopped position with respect to at least one of the stators (coils). It will be appreciated that the aligning steps may include fully stopping the rotor or the controller may generate a series of voltage application alignment steps in response to determining that the rotor has come to a full stop. The controller may determine that a full stop has occurred either by receiving BEMF signals from the rotor position detection circuit 21B included in the voltage application circuit 22 or by waiting a pre-determined period of time following receiving a signal indicating shutdown of the motor vehicle.

Figures 3A, 3B:
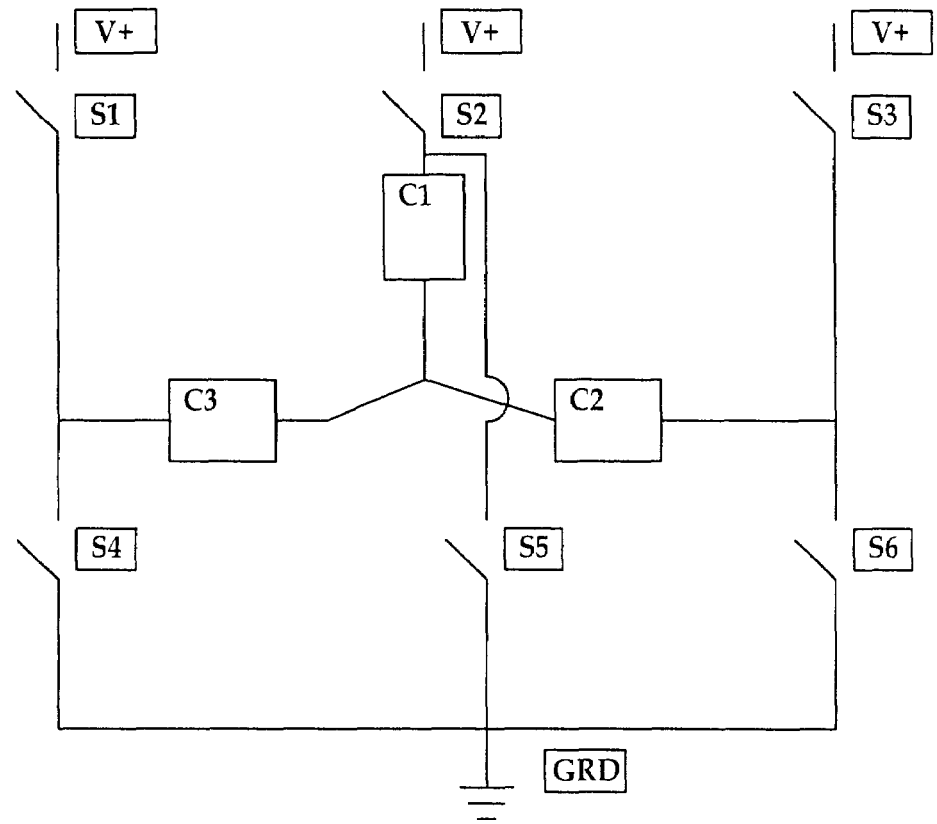
FIGS. 3A and 3B is a schematic logic diagram of a switching circuit associated with the sensorless brushless polyphase DC motor and an associated switch position sequence timing table according to an embodiment of the invention.

Referring to FIGS. 3A and 3B is shown an exemplary logic schematic diagram and associated timing table of the voltage application circuit 22 for the operation of a SBPM according to the present invention showing coils C1, C2, C3, e.g., spaced 120 degrees apart, together with three voltage signal inputs V+ which may be applied to one or more of the coils by positioning the switches S1-S6 in either an open (Off) or closed (V+ or GRD) position in a timed stepped sequence (e.g., I2-I7 shown in the timing table in FIG. 3B) to either bring the rotor to a known stopped aligned position (e.g., I1) or to start the rotor from a known stopped aligned position (e.g., I1) to an operating speed of the motor. For example, in the timing sequence shown in the timing table in FIG. 3B the sequential timing steps I2-I7 may be executed in a predetermined timed sequence to bring the rotor to a stop to align the rotor in a known stopped position as reflected by the position of the switches in I1. Likewise, the sequential timing steps I2-I7 may be executed in a predetermined timed sequence to bring the rotor up to an operating speed without alignment from the previously known aligned stopped position (I1).

It will be appreciated that the switching position steps I2 through I7 may be repeated in the sequence shown or in a different sequence or that other steps including switch positions may be used to stop and/or align the rotor to a known stopped position which may be different from I1 or to start the motor from the known stopped switch position (which corresponds to a rotor position).

In exemplary operation, a stop position (I1) of the switches S1-S6, as well as a sequence of stopping/aligning steps (I2-I7) is output in timed sequence by the controller 20 upon receiving a motor off signal by controller 20. Controller 20 selects the sequence or uses a pre-programmed sequence of aligning steps (e.g., I2 thru I7) from memory to align the motor (e.g., rotor) which may include bringing the rotor to a full stop where the final position (I1) is known. Alternatively, the controller 20 may generate the sequence of steps by selecting one or more of the steps in a sequence based on a determination of the angular velocity (speed) of the motor below a velocity threshold by optionally receiving at least two BEMF signals over a time interval from at least one of the coils via an optional rotor diction circuit included in the voltage application circuit 22.

Subsequently, the SBPM motor is started from the known stopped position (e.g., I1) upon receiving a motor-on signal by controller 20 and where controller 20 outputs a pre-programmed sequence of timed switch positioning steps (e.g., I2-I7) to accelerate the motor to an operating speed without any alignment operation being required. As mentioned above, in the case the SBPM motor is misaligned for any reason from its previous known stopped position, such a condition may be detected by the controller and the motor may be either re-aligned during or prior to the start-up sequence or a different start-up sequence of voltage application steps (switch positioning steps) may be employed to accelerate the motor to operating speed.

Figure 4A:
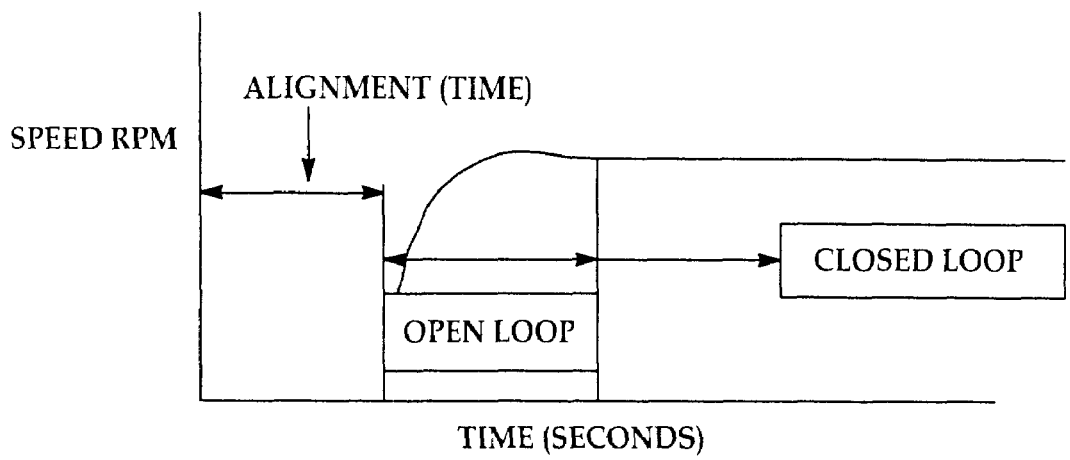
FIGS. 4A and 4B shows a startup speed versus time for sensorless brushless polyphase DC motor with and without alignment according to an embodiment of the invention.
Figure 4B:
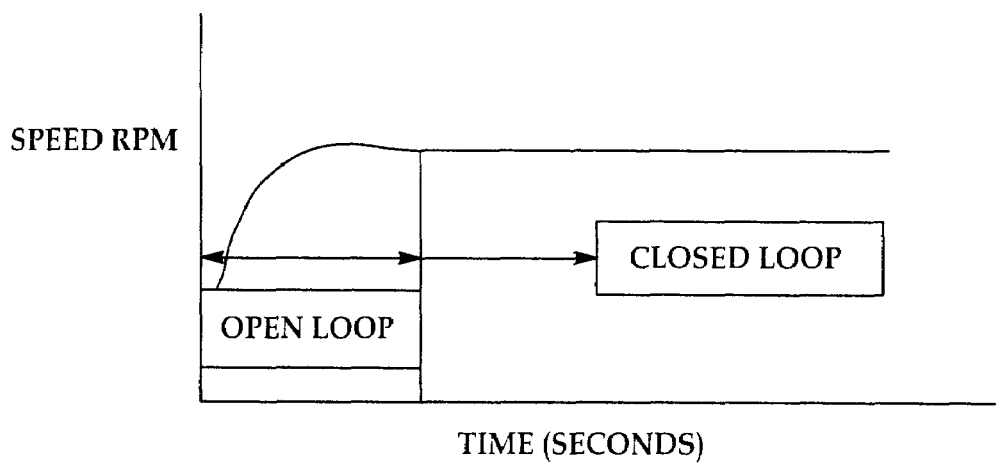

Referring to FIGS. 4A and 4B is shown an exemplary start-up sequence of a SBPM motor showing operating speed of the motor in revolutions per minute (RPM) versus time (seconds). In FIG. 4B is shown a start-up operation of a motor subsequent to a motor shut down and alignment operation according to the present invention compared to FIG. 4A of a motor start-up operation of a SBPM motor subsequent to a motor shut down without the alignment operation according to the present invention. The start-up operation of the motor includes a motor accelerating period referred to as 'open loop' operation prior to achieving a constant operating speed of the motor, referred to a 'closed loop' operation.

It is seen by comparing FIGS. 4A and 4B, that the alignment operation of the motor during the motor shut down process to achieve a known stop position according to the present invention, results in a reduced start-up time from the known stopped position by avoiding a necessary alignment operation during the start-up of the motor following motor shutdown without the alignment/stopping operation according to the present invention.

Figure 5:
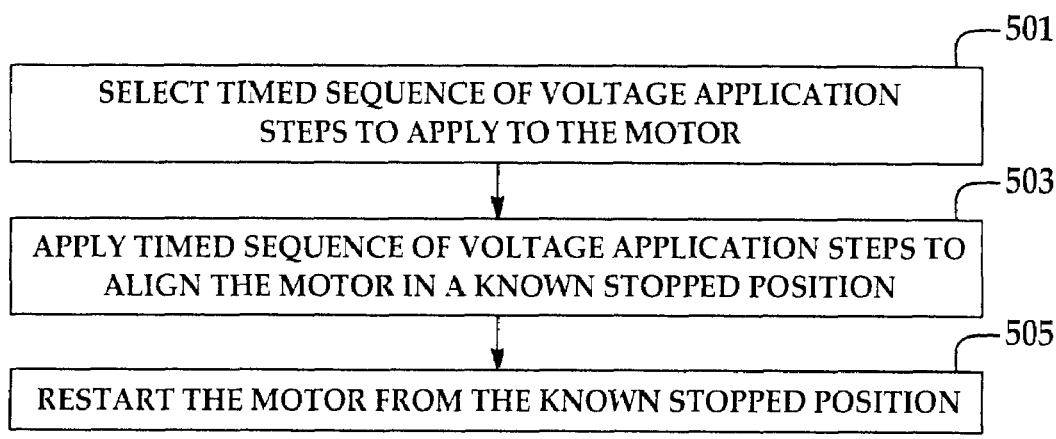
FIG. 5 is flowchart of the method of aligning a sensorless brushless polyphase DC motor according to embodiments of the invention.

Referring to FIG. 5, are shown an exemplary process flow steps according to the present invention. In step 501, following receipt of a motor-off signal, a timed sequence of voltage application steps is selected e.g., by a controller. In step 503, the timed sequence of voltage application steps is applied (e.g., through a switching circuit controlled by controller) to a sensorless brushless polyphase DC motor (SBPM) (to one or more coils) to align the motor (e.g., rotor with respect to coils) in a known stopped position. In step 505 the SBPM is restarted from the known stopped position.

While the embodiments illustrated in the Figures and described above are presently preferred, it should be understood that these embodiments are offered by way of example only. The invention is not limited to a particular embodiment, but extends to various modifications, combinations, and permutations as will occur to the ordinarily skilled artisan that nevertheless fall within the scope of the appended claims.

What is claimed is:

1. A method of aligning a sensorless brushless polyphase DC motor comprising:
aligning a rotor comprising said motor to a known stopped position with respect to at least one coil comprising said motor, said aligning during stopping of said motor wherein a voltage is applied to one or more coils comprising said motor in a first timed sequence of voltage application steps, said aligning comprising moving said rotor to said known stopped position during said stopping of said motor, said stopping comprising deceleration of said motor from a constant operating speed; and,
starting said rotor from said known stopped position without aligning said rotor with respect to said at least one coil to determine a position of said rotor, said starting including wherein a voltage is applied to one or more coils comprising said motor in a second timed sequence of voltage application steps.

2. The method of claim 1, wherein said first timed sequence of voltage application steps is provided to said motor by a controller.

3. The method of claim 2, wherein said first timed sequence of voltage application steps is pre-programmed and stored in memory comprising said controller.

4. The method of claim 2, wherein said first timed sequence of voltage application steps is determined by said controller in response to said controller determining an angular velocity of said rotor including zero angular velocity.

5. The method of claim 4, wherein said angular velocity is non-zero and below a predetermined angular velocity.

6. The method of claim 2, wherein said known stopped position is stored in memory comprising said controller and retrieved by said controller prior to the step of starting.

7. The method of claim 1, wherein said first timed sequence of voltage application steps is applied immediately following stopping of the rotor.

8. The method of claim 1, wherein said first timed sequence of voltage application steps moves the rotor in at least one of said motor operating direction and opposite to said motor operating direction.

9. The method of claim 1, wherein said known stopped position comprises said rotor positioned with respect to at least one of said coils in a position of maximum inductance.

10. The method of claim 1, wherein said motor comprises a motor driven apparatus in a motor vehicle.

11. The method of claim 10, wherein said motor driven apparatus comprises a fuel pump.

12. The method of claim 11, wherein said vehicle comprises a hybrid electric vehicle (HEV).

13. A method of aligning a fuel pump comprising a sensorless brushless polyphase DC motor in a motor vehicle, said method comprising:
aligning a rotor comprising said sensorless brushless polyphase DC motor to a known stopped position with respect to at least one coil comprising said sensorless brushless polyphase DC motor, said aligning during stopping of said motor wherein a voltage is applied to one or more coils comprising said motor in a first timed sequence of voltage application steps provided to said one or more coils by a controller, said aligning comprising moving said rotor to said known stopped position during said stopping of said motor, said stopping comprising deceleration of said motor from a constant operating speed;
starting said rotor from said known stopped position without aligning said rotor with respect to said at least one coil to determine a position of said rotor, said starting including wherein a voltage is applied to one or more coils comprising said motor in a second timed sequence of voltage application steps provided to said one or more coils by said controller.

14. The method of claim 13, wherein said first timed sequence of voltage application steps is determined by said controller in response to said controller determining an angular velocity of said rotor including zero angular velocity.

15. The method of claim 14, wherein said angular velocity is non-zero and below a predetermined angular velocity.

16. The method of claim 13, wherein said known stopped position is stored in memory comprising said controller following shut-down of said motor and recalled from memory prior to the step of starting.

17. The method of claim 13, wherein said first timed sequence of voltage application steps moves the rotor in at least one of said motor operating direction and opposite to said motor operating direction.

18. The method of claim 13, wherein said known stopped position comprises said rotor positioned with respect to at least one of said coils in a position of maximum inductance.

* * * * *